US009539527B2

(12) United States Patent
Nikoloudis et al.

(10) Patent No.: US 9,539,527 B2
(45) Date of Patent: Jan. 10, 2017

(54) FILTER (75) Inventors: Paschalis Nikoloudis, Goettingen (DE);
Ralf Lausch, Goettingen (DE);
Thomas Loewe, Goettingen (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 742 days.

(21) Appl. No.: 13/995,529

(22) PCT Filed: Dec. 15, 2011

(86) PCT No.: PCT/EP2011/006323
§ 371 (c)(1),
(2), (4) Date: Jun. 19, 2013

(87) PCT Pub. No.: WO2012/089307
PCT Pub. Date: Jul. 5, 2012

(65) Prior Publication Data
US 2013/0264252 A1 Oct. 10, 2013

(30) Foreign Application Priority Data
Dec. 28, 2010 (DE) .......................... 10 2010 056 148

(51) Int. Cl.
*B01D 29/21* (2006.01)
*B01D 27/06* (2006.01)

(52) U.S. Cl.
CPC ............. *B01D 29/21* (2013.01); *B01D 27/06* (2013.01); *B01D 2201/122* (2013.01)

(58) Field of Classification Search
CPC .................. B01D 46/522; B01D 2201/122
See application file for complete search history.

(56) References Cited

U.S. PATENT DOCUMENTS 6,598,749 B2 * 7/2003 Paul ...................... B01D 29/21
 210/457
8,328,023 B2 * 12/2012 Weiss ................... C08F 255/00
 210/500.21

(Continued)

FOREIGN PATENT DOCUMENTS

DE 39 35 503 12/1992
DE 693 29 118 12/2000

(Continued)

OTHER PUBLICATIONS

Translation International Preliminary Report on Patentability.
International Search Report of May 4, 2012.

*Primary Examiner* — Terry Cecil
(74) *Attorney, Agent, or Firm* — Gerald E. Hespos; Michael J. Porco; Matthew T. Hespos (57) ABSTRACT

A filter for the filtration of media, having a pleated, cylindrical filter element, which is located between a perforated, cylindrical backflow preventer and a perforated, cylindrical core, the filter element being arranged in pleated folds, a plurality of folds having a first fold height which is greater than the difference between the radius of the backflow preventer and the radius of the core and which, each being inclined in relation to a radial line by an angle of inclination, are directed away from the outer surface of the core, a plurality of folds being provided having at least one second shorter fold height, and the folds of the second shorter fold height being arranged adjacent, radially at the outside, to the backflow preventer and alternatingly adjacent to the folds of the first fold height.

14 Claims, 5 Drawing Sheets

(56) References Cited

U.S. PATENT DOCUMENTS

2002/0060183 A1    5/2002  Paul et al.
2004/0162203 A1    8/2004  Stoyell et al.
2007/0278149 A1*  12/2007  Kuwabara .............. B01D 29/21
                                                            210/493.2

FOREIGN PATENT DOCUMENTS

| DE | 693 33 430 | 7/2004 |
|----|------------|--------|
| DE | 693 34 045 | 1/2007 |
| EP | 0 667 800  | 7/2000 |
| EP | 0 982 061  | 2/2004 |
| EP | 1 140 319  | 6/2005 |
| JP | 10-244104  | 9/1998 |

* cited by examiner

FILTER

BACKGROUND OF THE INVENTION

1. Field of the Invention

The invention relates to a filter for the filtration of media, having a pleated, cylindrical filter element, which is located between a perforated, cylindrical backflow preventer and a perforated, cylindrical core, the filter element being arranged in pleated folds, a plurality of folds having a first fold height which is greater than the difference between the radius of the backflow preventer and the radius of the core and which, each being inclined in relation to a radial line by an angle of inclination, are directed away from the outer surface of the core.

2. Description of the Related Art

Optimized pleat and/or fold geometries are used in order to circumvent the classic problem of the star-shaped pleat fold arrangement in cylindrically shaped filter elements. This fold arrangement deploys radial folds of identical fold height, which are tightly pressed together on the smallest circumference on the core, but are located far apart on the outer circumference on the backflow preventer. In this manner, a large proportion of the space provided cannot be filled with filter material, and the mechanical stability of the filter element in the outer region is compromised by the potential for movement of the folds in the free spaces which are located in between. Filter surfaces which are achieved with two layers of membranes measure approximately 0.5 to 0.7 sq.m. per 10 inches of element.

An increase of the filter surface is often achieved by means of thinner filter materials, or in particular by thinner drainage and/or spacer materials. The number of folds per filter element and, therefore, the filter surface are thus increased. A disadvantageous consequence is a reduced mechanical stability of the folds made from these thinner materials. In addition, the inflow to the filter materials which are located between the folds is associated with an increasing flow resistance, when using thinner drainage and/or spacer materials. As a result, the throughput performance may drop despite a larger filter surface. Beyond this, there is the danger that the inflow can no longer pass to the end regions of the intermediate spaces between the folds, or that air pockets are formed. The filter surface in these regions then becomes inactive.

The fundamental endeavor is thus to increase the filtration performance as a function of throughput and service life.

DE 693 29 118 T2, DE 693 34 045 T2 and DE 693 33 430 T2, which belong to the same patent family, disclose a filter having a pleated, cylindrical filter element which is located between a backflow preventer and a core. The filter element here is formed with multiple layers and arranged in pleated folds which have a fold height which is greater than the difference between the radius of the outer cylinder and the radius of the core. The folds here are directed away in curved shaped from the outer surface of the core in a tangential direction and have an angle of inclination in relation to a radial line.

The fold height may be significantly increased here, these oversized folds being increasingly inclined tangentially towards the outer cylinder, such that a space which has hitherto not been filled with filter material may also be filled up to the outer cylinder.

However, the long intermediate spaces which have to be perfused between folds in this known filter are disadvantageous. There is the danger that the inflow can no longer pass to the end regions of the intermediate spaces between the folds, or that air pockets are formed. The filter surface in these regions then becomes inactive.

Furthermore, DE 39 35 503 C2 discloses a ring filter element made from a filter material which has been folded in a zigzag shape with folds which are radially oriented and of different lengths in the direction of the radial depth, the shorter ones being located outside in the radial direction. Here, at least two long folds should follow each short one, the short and the long folds each having the same radial depth as viewed across the entire circumference.

In the case of these radially arranged long folds and the short folds located in between, it is disadvantageous that the available filter surface is relatively small, which leads to an insufficient filtration performance. Moreover, the stability of such filters needs improvement.

The object of the present invention is to improve the known filters in such a manner that their performance, and in particular their service life, are increased while good mechanical stability of the filter element is maintained simultaneously.

SUMMARY OF THE INVENTION

This object is achieved in that a plurality of folds having at least one second shorter fold height are provided, and that the folds of the second shorter fold height are arranged radially adjacent to the backflow preventer and alternatingly adjacent to the folds of the first fold height.

The shorter folds fill up the larger circumference in the radial direction towards the outside. The available circumference decreases towards the core, the longer folds therefore remaining towards the inside and/or terminating at the core, while the shorter folds, when viewed from the outside, terminate between core and backflow preventer. The long folds which remain towards the inside and which are inclined in relation to a radial line by an angle of inclination have a high mechanical strength which continues through the folds with a second shorter fold height, which are inserted in between, in the region of the outer circumference towards the backflow preventer. Surprisingly, the performance in terms of service life increases greatly. As a result of its high mechanical stability and its increased service life paired with good throughput performance, the filter according to the invention is also well suited to industrial applications with pressure variations and/or pressure shocks, and to thermal loads occurring in sterilization with superheated steam.

According to a preferred embodiment of the invention, the number of folds with a shorter fold height is half of the number of folds with the first higher fold height. This means a fold ratio of 2:1 between the folds with the first longer fold height and the folds with the second shorter fold height.

According to a further preferred embodiment of the invention, the number of folds with a shorter fold height corresponds to the number of folds with the first fold height.

Thus, the ratio between the folds with the first longer fold height and the folds with the second shorter fold height is 1:1.

According to a further preferred embodiment of the invention, the folds of the shorter, second fold height, at their end facing away from the backflow preventer, terminate approximately on a virtual radius which is greater than or equal to the radius of the core plus a quarter of the difference between the radius of the backflow preventer and the radius of the core. A virtual radius which is approximately identical to the radius of the core plus half of the difference between the radius of the backflow preventer and the radius of the core, has also proven favorable.

The folds of the first fold height each have an angle of inclination which is greater than 15° at least in their region which is not adjacent to folds of a second fold height, that is to say in a region situated within the virtual radius.

For example, an angle of inclination of 20° in the region close to the inner cylinder has proven advantageous at a fold ratio of 2:1.

According to a further preferred embodiment of the invention, the folds with the first fold height each have an angle of inclination which is greater than 25°. It is further preferred that the folds with the first fold height each have an angle of inclination which is greater than 40°.

For example, an angle of inclination of 50° has proven advantageous in terms of the percolation of water at a fold ratio of 1:1.

In a further exemplary embodiment, an angle of inclination of 60° has proven advantageous particularly in terms of service life at a fold ratio of 1:1.

According to a further preferred embodiment of the invention, the filter element consists, in a sequenced arrangement, of one or more layers of drainage or spacer material, one or more layers of filter material with a selective separation property during perfusion, and, finally, another one or more layers of drainage and/or spacer material.

Here, the filter material may be formed using a polymer porous membrane made from polyether sulfone (PESU) or polyamide or polyvinylidene fluoride or a cellulose derivative, such as cellulose mixed ester, cellulose acetate, cellulose nitrate or cellulose or polypropylene or polyethylene or polytetrafluoroethylene and/or expanded polytetrafluoroethylene or polyvinyl chloride. The filter material may also be formed using mineral or polymer fiber filtration media or bonded and/or non-bonded non-wovens, such as spunlaids or melt-blown spunlaids or staple fiber webs or carded webs, or using cellulose or polyester or polyolefins, such as PE or PP, or glass fibers or glass microfibers. Finally, it is possible for the filter material to be formed using a fabric or an extruded net made of an aforementioned polymer.

It is further possible that the filter material is formed using a functionalized porous filtration medium, such as a modified polymer membrane made of polyamide or polyether sulfone or cellulose acetate.

Further details of the invention will emerge from the following extensive description and the attached drawings in which preferred embodiments of the invention are illustrated in an exemplary manner.

DETAILED DESCRIPTION OF THE PREFERRED EMBODIMENTS

A filter 1 consists substantially of a filter element 2, a backflow preventer 3 and a core 4.

The filter element 2 is formed with multiple layers and arranged in pleated first folds 5 with a first fold height 6 and second folds 7 with a second fold height 8.

The first fold height 6 of the first folds 5 is greater than the difference between the radius (inner radius) 9 of the backflow preventer 3 (an outer cylinder, for example) and the radius (outer radius) 10 of the core 4 (an inner cylinder, for example).

The first folds 5 of the first fold height 6 each have in their region which is not adjacent to the second folds 7 of the second fold height 8 and which is directed away from the outer surface 11 of the core 4, an angle of inclination 13, in relation to a radial line 12.

The second folds 7 of the shorter second fold height 8, at their ends 14 facing away from the backflow preventer 3, terminate approximately on a virtual radius 15 which is greater than or equal to the radius 10 of the core 4 plus a half of the difference between the radius 9 of the backflow preventer 3 and the radius 10 of the core 4. Accordingly, the virtual radius 15 corresponds to at least half of the sum of the two radii 9, 10.

Figure 1:
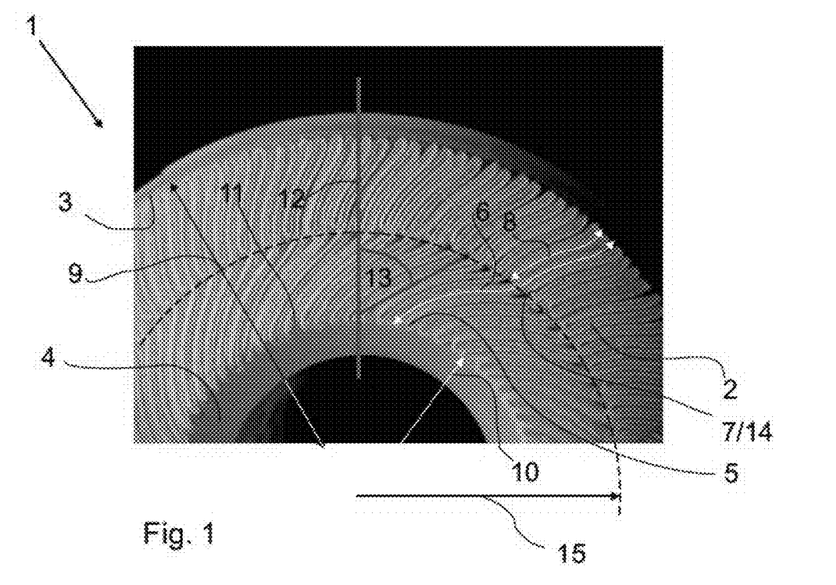
FIG. 1 is a magnified plan and sectional view of a first embodiment of a filter.
Figure 2:
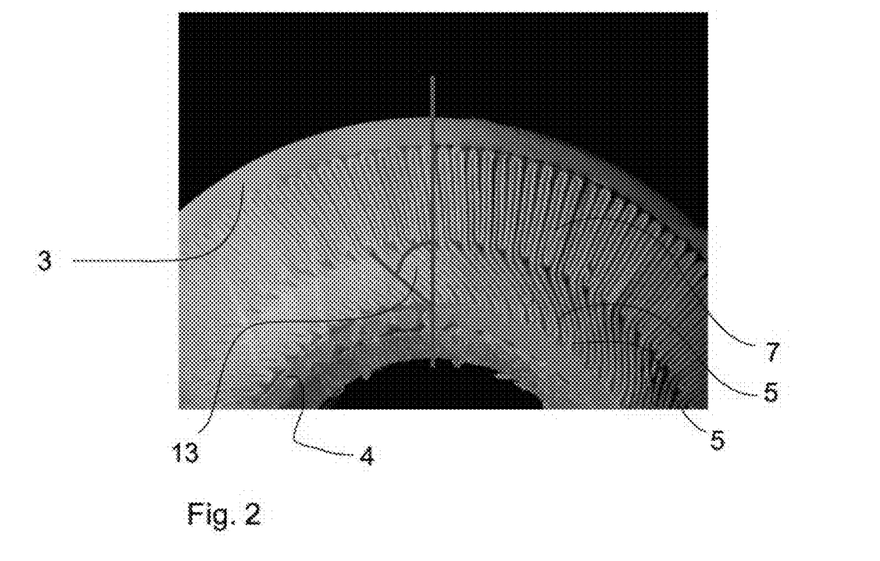
FIG. 2 is a magnified plan and sectional view of a second embodiment of a filter.
Figure 3:
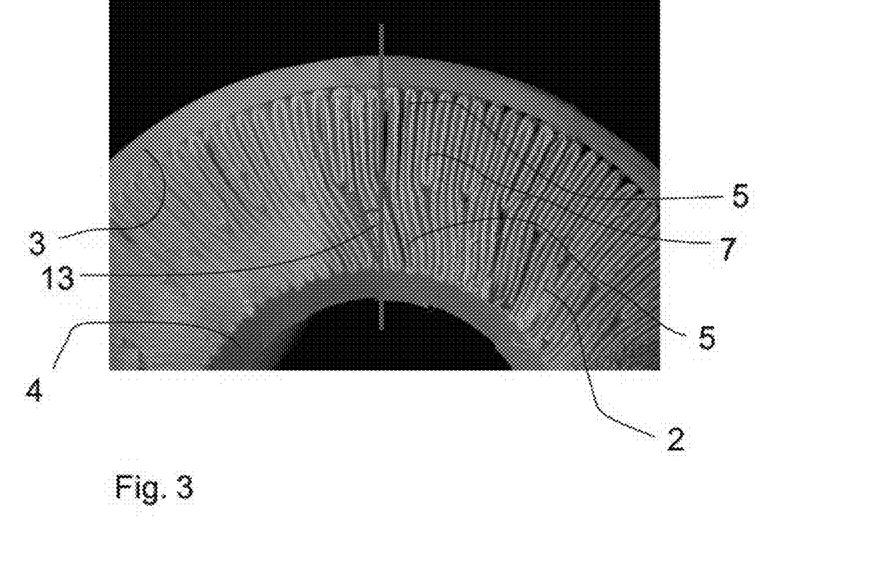
FIG. 3 is a magnified plan and sectional view of a third embodiment of a filter.
Figure 4:
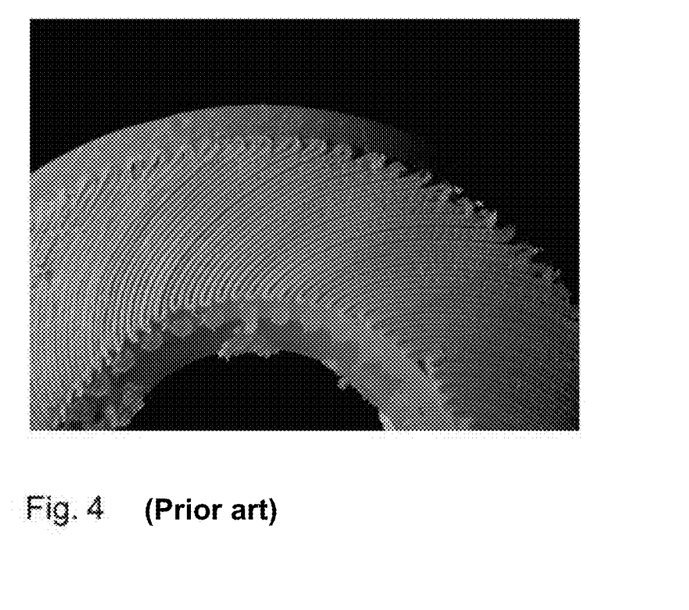
FIG. 4 is a magnified plan and sectional view of a comparative filter according to the prior art.
Figure 5:
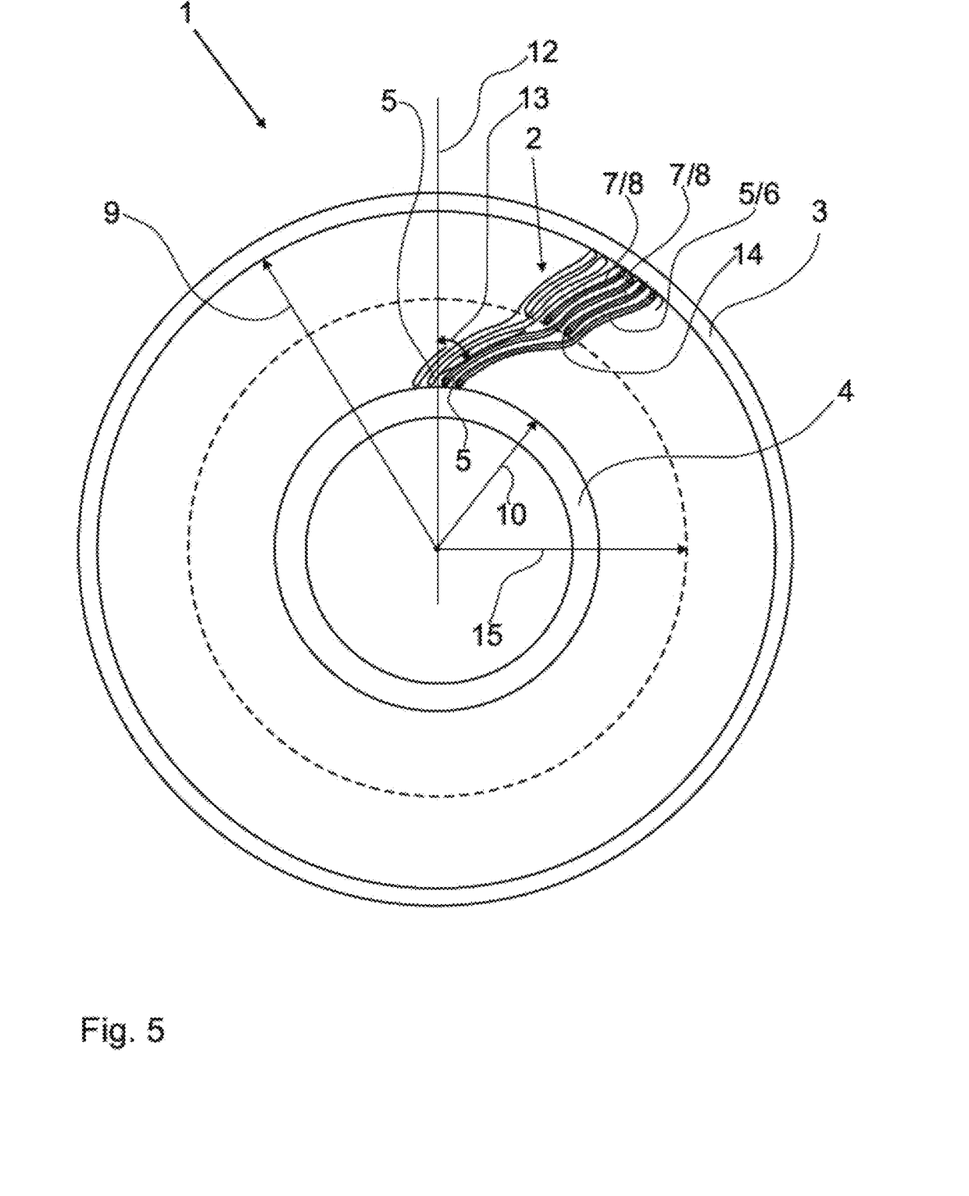
FIG. 5 is a magnified plan view of the embodiment of the filter according to FIG. 1 with a partially illustrated filter element.
Figure 6:
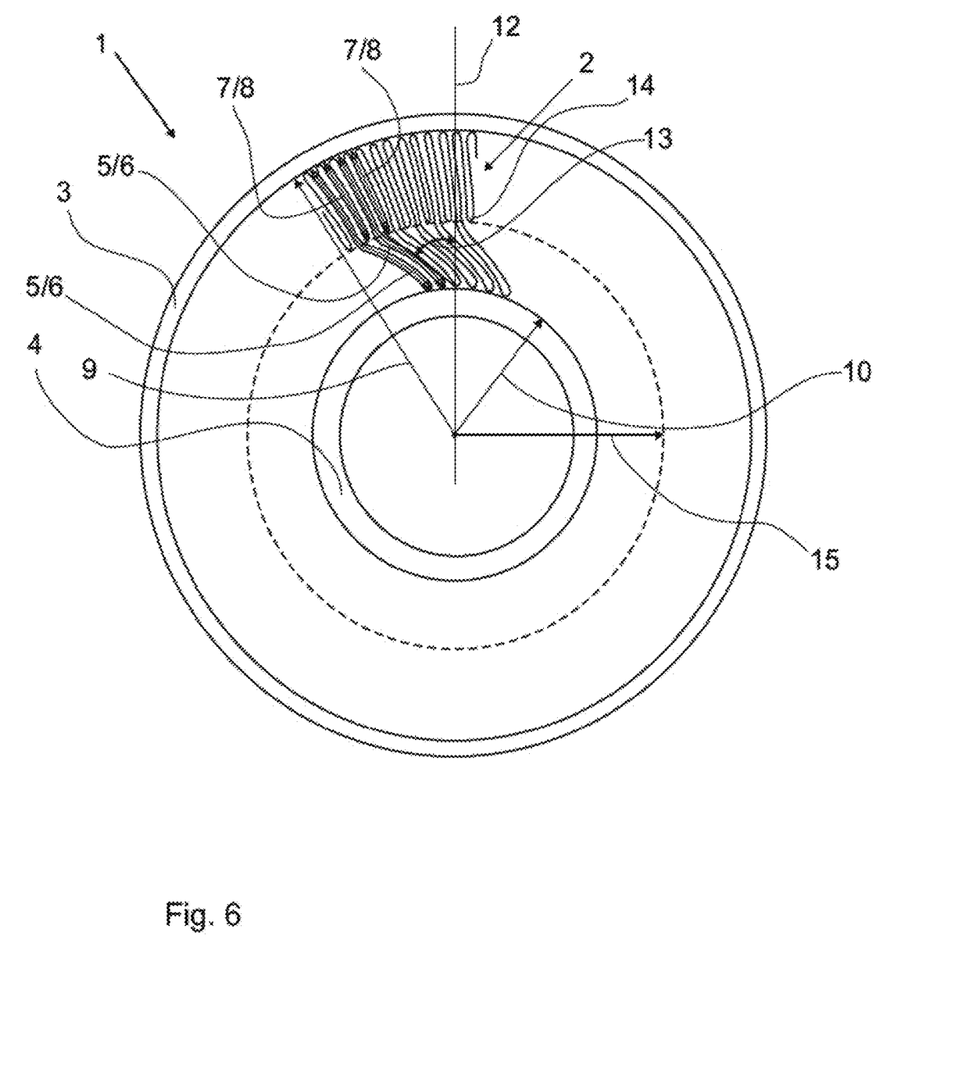
FIG. 6 is a magnified plan view of the embodiment of the filter according to FIG. 2 with a partially illustrated filter element.
Figure 7:
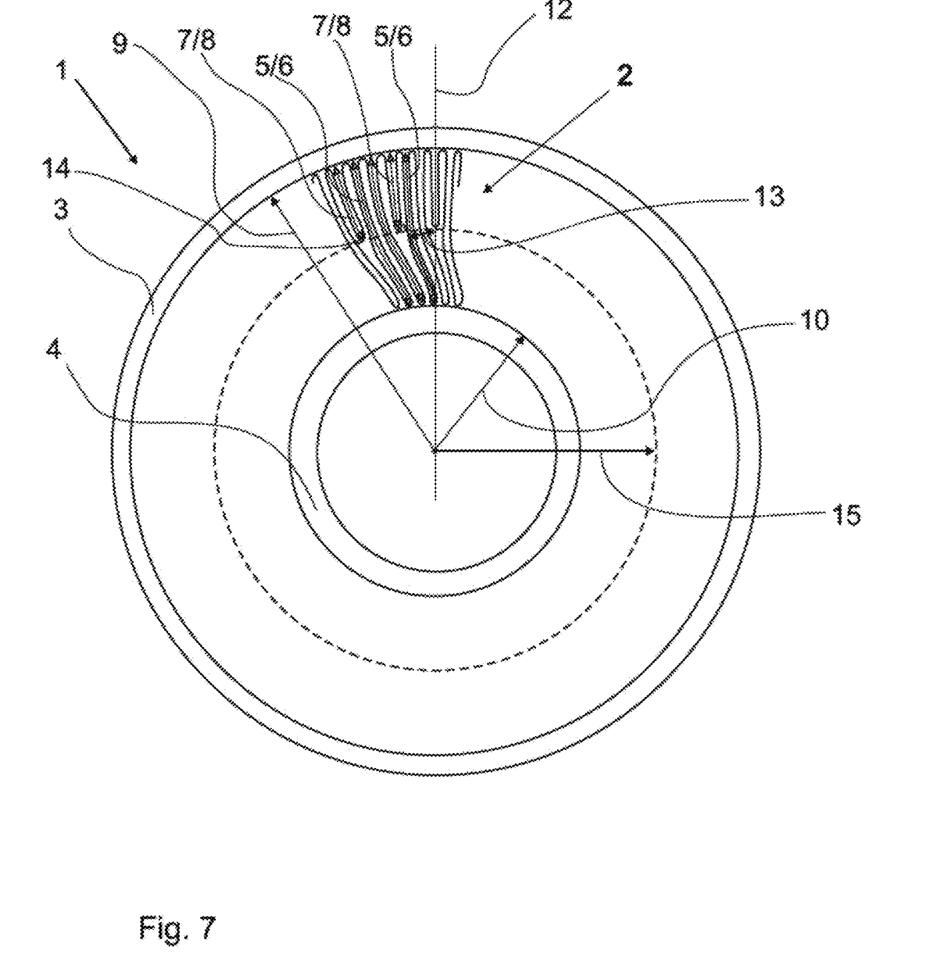
FIG. 7 is a magnified plan view of the embodiment of the filter according to FIG. 3 with a partially illustrated filter element.

With four different filter elements 2, corresponding to the embodiments in FIGS. 1 to 3 and two comparative filter elements according to the prior art as in FIG. 4, the filtration performance was measured as a function each of service life and water percolation.

Description of the Measurement of Service Life:

The measurement of service life is carried out using a liquid aqueous solution which is capable of blocking microfiltration elements of a volume controllable under laboratory conditions.

The model solution consists of a diluted aqueous solution of KSE coffee surrogate extract, Art. No. 061114, Günzburger Nahrungsmittelfabrik Gebr. Strehle GmbH, Auweg 1, 89312 Günzburg, and Ovomaltine NF 500 g, Art. No. 2300028, Importhaus Wilms, Heinrich-Hertz-Straße 2, 65232 Taunusstein.

The measurement is carried out by feeding the solution into a filter housing 1/1, STD, T-type, Liquids, Order No. 7S11LEN00147, Sartorius Stedim Biotech, and with a differential pressure measuring device for the differential pressure between the inlet and the outlet of the filter housing. The mass of solution which has been filtered is determined. Measuring is terminated once the filtered mass flow has reached 5% of the maximum mass flow registered during the measurement. The mass of solution which has been filtered up to this point in time is the service life measurement result. The temperature of the solution is 20° C.; the differential pressure between the inlet and the outlet where the filtrate exits the filter housing is maintained at a constant level.

Definition of Water Percolation of a Filter Element:

Percolation is defined as the mass flow of water which percolates through a filter element, which is located in a filter housing, at a differential pressure of 0.5 bar between the inlet and the outlet where the filtrate exits.

Description of the Measurement of Water Percolation:

The testing arrangement consists of a filter housing 1/1, STD, T-type, Liquids, Order No. 7S11LEN00147, Sartorius Stedim Biotech. Furthermore, a differential pressure measuring apparatus for the differential pressure between inlet and outlet of the filter housing, and a flow meter for measuring the flow volume of water, are installed on the filter housing. The water temperature is 20° C. The percolation measurement is carried out at 0.5 bar constantly set differential pressure.

Example A

FIG. 1

Two filter elements corresponding to FIG. 1 according to Ex. C, Batch 10022583, were manufactured. The examinations and tests with the filter elements delivered the following result:

| Example | Fold ratio/ heights | Number of folds | Filter surface $m^2$ | Angle of inclination ° | Service life kg | Water percolation l/min | Specific service life $kg/m^2$ | Specific water percolation $l/min\ m^2$ |
|---|---|---|---|---|---|---|---|---|
| A | 1:1/ 20:8 | 74:74 | 0.99 | 60 | 67 | 31.5 | 67 | 32 |
| A1 | 1:1/ 20:8 | 74:74 | 0.99 | 60 | 42.6 | 36.9 | 43 | 37 |

Bill of materials of the filter elements
Inner diameter (2×$R_9$)
Backflow preventer 3: 68 mm
Outer diameter (2×$R_{10}$)
Core 4: 32 mm
Drainage material inside
(Filtrate side): novatexx 2035
Drainage material outside
(Inflow side): A: novatexx 2035
  A1: extruded net
Prefilter material: PESU, SSB type 15445, Batch 1050433
  Roll 107
Final filter material: PESU, SSB type 15407, Batch 1050313
  Roll 4

Example B

FIG. 2

Filter elements corresponding to FIG. 2 according to Ex. C, Batch 10002883(1), were manufactured. The examinations and tests with the filter elements delivered the following result:

| Example | Fold ratio/ heights | Number of folds | Filter surface $m^2$ | Angle of inclination ° | Service life kg | Water percolation l/min | Specific service life $kg/m^2$ | Specific water percolation $l/min\ m^2$ |
|---|---|---|---|---|---|---|---|---|
| B | 1:1/16:8 | 75:75 | 0.86 | 50 | 49.6 | 41.6 | 57 | 48 |

Bill of materials of the filter elements
Inner diameter ($2 \times R_9$)
Backflow preventer 3: 68 mm
Outer diameter ($2 \times R_{10}$)
Core 4: 38 mm
Drainage material inside
(Filtrate side): novatexx 2035
Drainage Material Outside
(Inflow side): novatexx 2035
Prefilter material: PESU, SSB type 15445, Batch 1050433
Final filter material: PESU, SSB type 15407, Batch 1050313

Example C
FIG. 3

Filter elements corresponding to FIG. 3 according to Ex. C, Batch 10002883(1), were manufactured. The examinations and tests with the filter elements delivered the following result:

| Example | Fold ratio/ heights | Number of folds | Filter surface $m^2$ | Angle of inclination ° | Service life kg | Water percolation l/min | Specific service life kg/$m^2$ | Specific water percolation l/min $m^2$ |
|---|---|---|---|---|---|---|---|---|
| C | 2:1/16:8 | 90:45 | 0.86 | 20 | 54.9 | 44.7 | 64 | 52 |

Bill of materials of the filter elements
Inner diameter ($2 \times R_9$)
Backflow preventer 3: 68 mm
Outer diameter ($2 \times R_{10}$)
Core 4: 38 mm
Drainage material inside
(Filtrate side): novatexx 2035
Drainage material outside
(Inflow side): novatexx 2035
Prefilter material: PESU, SSB type 15445, Batch 1050433
Final filter material: PESU, SSB type 15407, Batch 1050313

Example V1
Web

Filter elements corresponding to FIG. 4 according to the prior art according to Ex. C, Batch 10027783 were manufactured. The examinations and tests with the filter elements delivered the following result:

| Example | Fold ratio/ heights | Number of folds | Filter surface $m^2$ | Angle of inclination ° | Service life kg | Water percolation l/min | Specific service life kg/$m^2$ | Specific water percolation l/min $m^2$ |
|---|---|---|---|---|---|---|---|---|
| V1 | 1/23 | 91 | 1 | N/A | 33.7 | 31.6 | 34 | 32 |

Bill of materials of the filter elements
Inner diameter ($2 \times R_9$)
Backflow preventer 3: 68 mm
Outer diameter ($2 \times R_{10}$)
Core 4: 38 mm
Drainage material inside
(Filtrate side): novatexx 2035
Drainage material outside
(Inflow side): novatexx 2035
Prefilter material: PESU, SSB type 15445, Batch 1050433
Final filter material: PESU, SSB type 15407, Batch 1050313

Example V2

Net

Filter elements corresponding to FIG. 4 according to the prior art according to Ex. C, Batch 10027783 were manufactured. The examinations and tests with the filter elements delivered the following result:

| Example | Fold ratio/ heights | Number of folds | Filter surface m² | Angle of inclination ° | Service life kg | Water percolation l/min | Specific service life kg/m² | Specific water percolation l/min m² |
|---|---|---|---|---|---|---|---|---|
| V2 | 1/23 | 91 | 1.00 | N/A | 36.2 | 35.6 | 36 | 36 |

Bill of materials of the filter elements
Inner diameter (2×R₉)
Backflow preventer 3: 68 mm
Outer diameter (2×R₁₀)
Core 4: 38 mm
Drainage material inside
(Filtrate side): novatexx 2035
Drainage material outside
(Inflow side): extruded net
Prefilter material: PESU, SSB type 15445, Batch 1050433
Final filter material: PESU, SSB type 15407, Batch 1050313
The following examples are comparable:
example A with V1,
example A1 with V2, and
the examples B and C with V1 and with A.
Summary Table:

| Example | Fold ratio/ heights | Number of folds | Filter surface m² | Angle of inclination ° | Service life kg | Water percolation l/min | Specific service life kg/m² | Specific water percolation l/min m² |
|---|---|---|---|---|---|---|---|---|
| A | 1:1/ 20:8 | 74:74 | 0.99 | 60 | 67 | 31.5 | 67 | 32 |
| V1 | 1/23 | 91 | 1.00 | N/A | 33.7 | 31.6 | 34 | 32 |
| A1 | 1:1/ 20:8 | 74:74 | 0.99 | 60 | 42.6 | 36.9 | 43 | 37 |
| V2 | 1/23 | 91 | 1.00 1 | N/A | 36.2 | 35.6 | 36 | 36 |
| B | 1:1/ 16:8 | 75:75 | 0.86 | 50 | 49.6 | 41.6 | 57 | 48 |
| C | 2:1/ 16:8 | 90:45 | 0.86 | 20 | 54.9 | 44.7 | 64 | 52 |

When comparing the examples B and C with V1 or with A1, it is evident that a significant increase of the filtration performance in relation to the prior art is achieved based on the pleating according to the invention as in example A, despite the smaller filter surface in the examples (reason: outer diameter of the core is larger).

The invention claimed is:

1. A filter for filtration of media, the filter comprising a pleated, cylindrical filter element (2), which is located between a perforated, cylindrical backflow preventer (3) with an inner surface having a radius (9) and a perforated, cylindrical core (4) with an outer surface having a radius (10), the filter element (2) being arranged in pleated folds (5, 7) including a plurality of first folds (5) having a first fold height (6) which is greater than a difference between the radius (9) of the backflow preventer (3) and the radius (10) of the core (4), each of the first folds (5) being inclined in relation to a radial line (12) by an angle of inclination (13) and being directed away from the outer surface (11) of the core (4), and a plurality of second folds (7) being provided and having at least one second fold height (8) shorter than the first fold height (6), and the second folds (7) being arranged radially adjacent to the backflow preventer (3) and alternatingly adjacent to the first folds (5), the second folds (7) having ends (14) facing away from the backflow preventer (3) that terminate approximately on a virtual radius (15) that is greater than or equal to the radius (10) of the core (4) plus a quarter of a difference between the radius (9) of the backflow preventer (3) and the radius (10) of the core (4), and the first folds (5) each have an angle of inclination (13) relative to the radius (10) of the core (4) that is greater than 15° at least in their region that is not adjacent to second folds (7), each of the first folds (5) being in face-to-face contact with at least one other of the first folds (5) in a region between the core (4) and the virtual radius (15), wherein the first folds (5) each have a first angle of inclination (13) relative to the radius (10) of the core (4) at positions between the core (4) and the virtual radius (15) and a second different angle of inclination (13) relative to the radius (10) of the core (4) at positions between the virtual radius (15) and the backflow preventer (3).

2. The filter of claim 1, the number of the second folds (7) is half of or less than half of the number of the first folds (5).

3. The filter of in claim 1, wherein the number of the second folds (7) corresponds to the number of the first folds (5).

4. The filter of claim 1, wherein the first folds (5) each have an angle of inclination (13) that is greater than 25°.

5. The filter of claim 4, wherein the first folds (5) each have an angle of inclination (13) that is greater than 40°.

6. The filter of claim 1, wherein the filter element (2) comprises, in a sequenced arrangement, one or more layers of drainage or spacer material, one or more layers of filter material with a selective separation property during perfusion, and, another one or more layers of drainage and/or spacer material.

7. The filter of claim 6, wherein the filter material is formed using a polymer porous membrane made from at least one of: polyether sulfone, polyamide, polyvinylidene fluoride, a cellulose derivative, cellulose mixed ester, cellulose acetate, cellulose nitrate, cellulose, polypropylene, polyethylene, polytetrafluoroethylene, expanded polytetrafluoroethylene or polyvinyl chloride.

8. The filter of claim 6, wherein the filter material is formed using mineral or polymer fiber filtration media or bonded and/or non-bonded non-wovens, or staple fiber webs or carded webs or using cellulose or polyester or polyolefins, or glass fibers or glass microfibers.

9. The filter of claim 6, wherein the filter material is formed using a fabric or an extruded net made of a polymer.

10. The filter of claim 6, wherein the filter material is formed using a functionalized porous filtration medium.

11. The filter of claim 10, wherein the functionalized porous filtration medium is a modified polymer membrane made of polyamide or polyether sulfone or cellulose acetate.

12. The filter of claim 1, wherein the first angle of inclination (13) is greater than the second angle of inclination.

13. The filter of claim 1, wherein all of the first and second folds (5, 7) are substantially radially aligned at positions between the virtual radius (15) and the backflow preventer (3).

14. The filter of claim 1, wherein each of the first folds (5) is in face-to-face contact with two other of the first folds (5) in a region between the core (4) and the virtual radius (15).

* * * * *